United States Patent [19]

Katoh et al.

[11] Patent Number: 5,213,652
[45] Date of Patent: May 25, 1993

[54] PNEUMATIC RADIAL TIRE INCLUDING 1×2 STEEL CORDS

[75] Inventors: Hisao Katoh; Susumu Imamiya, both of Hiratsuka, Japan

[73] Assignee: The Yokohama Rubber Co., Ltd., Japan

[21] Appl. No.: 810,300

[22] Filed: Dec. 19, 1991

Related U.S. Application Data

[63] Continuation-in-part of Ser. No. 575,602, Aug. 31, 1990, abandoned.

[30] Foreign Application Priority Data

Sep. 11, 1989 [JP] Japan .................................. 1-232909

[51] Int. Cl.$^5$ .............................. B60C 9/00; B60C 9/18
[52] U.S. Cl. ...................................... 152/451; 57/200; 57/311; 57/902; 152/527
[58] Field of Search .......................... 152/451, 527, 556; 57/902, 200, 311

[56] References Cited

U.S. PATENT DOCUMENTS

| | | | |
|---|---|---|---|
| 4,333,306 | 6/1982 | Yamashita et al. | 152/451 X |
| 4,749,017 | 6/1988 | Loesch | 152/527 |
| 4,836,262 | 7/1989 | Nishizawa et al. | 152/527 X |
| 4,938,015 | 7/1990 | Kinoshita | 152/527 X |
| 5,004,031 | 4/1991 | Kadota et al. | 152/527 X |
| 5,054,531 | 10/1991 | Nakakita et al. | 152/451 X |
| 5,054,532 | 10/1991 | Kohno et al. | 152/527 |
| 5,061,557 | 10/1991 | Kot et al. | 57/902 X |
| 5,135,039 | 8/1992 | Mizuta et al. | 152/451 |

*Primary Examiner*—Michael W. Ball
*Assistant Examiner*—Adrienne C. Johnstone
*Attorney, Agent, or Firm*—Finnegan, Henderson, Farabow, Garrett & Dunner

[57] ABSTRACT

A pneumatic radial tire for automotive vehicles comprising a least one rubber coated steel cord consisting of a pair of intertwisted filaments and having a flatness ratio f in the range of $0.6 \leq f \leq 0.9$, where f is defined by $2d/h$, where d is a diameter of a filament and h is the maximum diameter of the flattened 1×2 cord. This cord is obtained by deforming the cord with a force applied transversely and unidirectionally over its length.

2 Claims, 2 Drawing Sheets

PNEUMATIC RADIAL TIRE INCLUDING 1×2 STEEL CORDS

This application is a continuation-in-part of application Ser. No. 575,602, filed Aug. 31, 1990 now abandoned.

BACKGROUND OF THE INVENTION

1. Field of the Invention

This invention relates to pneumatic radial-ply tires for motor vehicles, more particularly to a steel cord reinforcement therefor.

2. Prior Art

Advanced pneumatic radial-ply tires for passenger cars as well as heavy-duty automotive vehicles are provided typically with belt layers made up of rubber coated steel cords. Organic fiber cords such as of aramid have also found wide application for the belts of the radial tire but have mostly been accompanied with the use of rubber coated steel cords at least for one belt layer to provide increased rigidity.

While steel cords are suitable for use as belt reinforcement material in view of their high rigidity and strength, the cords being steel are susceptible to corrosion attack by water or moisture permeating through an external injury on the tire which would lead to separation from a coat rubber surrounding the cords and thus pose a durability problem. To solve this problem, there has been proposed a so-called rubber penetrated steel cord having two filaments in the tire core and a strand construction of 2+7, 2+6 and so on having increased filament-to-filament spacing in the outer sheath of the tire. However, such cords literally require so many steel wires that the belt portion of the tire becomes objectionably thick and that this is economically disadvantageous. Cords with less filaments such as of a 2+2 strand were also proposed and put to use. Even simpler cord structures having a 1×2 strand are also known as disclosed, for instance in Japanese Laid-Open Patent Publication Nos. 62-117893 and 62-234921. Coat rubber for 1×2 steel cords is desirably low in Mooney viscosity a the time of vulcanization to facilitate filling between the filaments of the cord, and preferably high in modulus after vulcanization to retain flexibility of the cord. These cords, however, are not quite satisfactory in terms of durability as the are also prone to get corroded by water permeation through the belt layers to which the cords are applied.

SUMMARY OF THE INVENTION

With the foregoing problems associated with the prior art in view, research efforts have been made to arrive at the present invention based on the following findings.

(1) Filaments of a 1×2 cord contacted with each other continuously over their entire lengths are liable to relative displacement during use of the tire which would result in small pores or voids formed in proximity to the contact areas.

(2) The above voids are quite small compared to those formed in closed-twist cords but large enough to receive water droplets or water vapor.

(3) The rate of speed of water permeation through the voids is much greater than that of dispersive permeation of water from the tire surfaces.

(4) Therefore, water penetrating through external injury into the interior of the tire is apt to permeate longitudinally or the cord, leading to corrosion. Repeated deformation of the belt on running of the tire causes the filaments to scratch each other resulting in fretting. Hence, conventional 1×2 cords pose a problem associated with anti-corrosive fatigue imposed during moisture absorption. An example of such 1×2 cord is shown in FIG. 4, from which it will be seen that the filaments are held continuously in linear contact with each other longitudinally of the cord as indicated at A, B and C.

(5) It is therefore believed effective to intercept the continuity of contact between the two filaments.

(6) Since it is impractical to totally eliminate the contact between two filaments longitudinally of the cord, it would be a more practical approach to provide periodically alternate contact and non-contact areas throughout the length of the cord.

(7) This approach can be implemented by flattening the cord, as by pressing the cord transversely from one side over its entire length.

Briefly stated, a pneumatic radial tire contemplated under the invention incorporates at least one rubber coated steel cord layer applied, for example, to a belt portion of the tire, which belt portion, if plural in its layer, may include other fiber cords such as aramid. The tire may be used for passenger cars or heavy-duty vehicles.

A primary object of the invention resides in the provision of a pneumatic radial tire having a rubber coated steel cord of a 1×2 strand construction which may be effectively applied to the belt, carcass or bead portion of the tire, and which is immune to corrosive damage or separation from the rubber layer which would otherwise result from contact with water penetrating through cuts in the tread and permeating longitudinally of the cord, thereby contributing to prolonged service life of the tire.

The above and other objects and features will become apparent from the following description taken with reference to the accompanying drawings.

According to the invention, there is provided a pneumatic radial tire for automotive vehicles which comprises at least one rubber coated steel cord consisting of a pair of filaments having a flatness ratio f in the range of $$0.6 \leq f \leq 0.9$$

where
  f is defined by $2d/h$
where
  d is a diameter of said filament and h is a maximum diameter of said cord.

DETAILED DESCRIPTION OF THE INVENTION

A pneumatic radial tire with which the invention is concerned has two steel wire filaments stranded or intertwisted into a 1×2 cord embedded in a rubber coat, the cord having a flatness ratio of 0.6≦f≦0.9.

Figure 1:
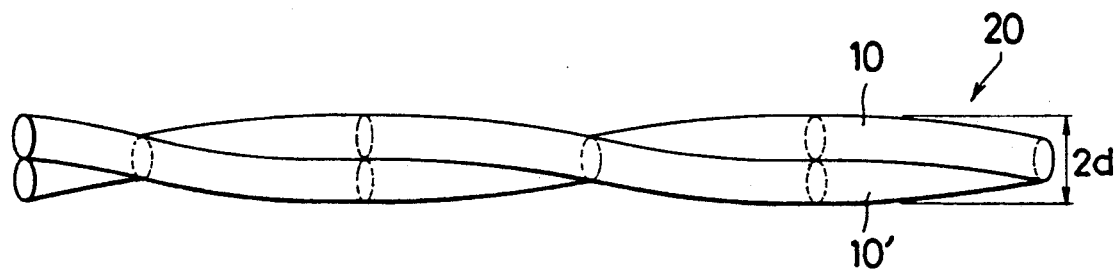
FIG. 1 is a diagrammatic side view of the flattened 1×2 steel cord of FIG. 2.
Figure 2:
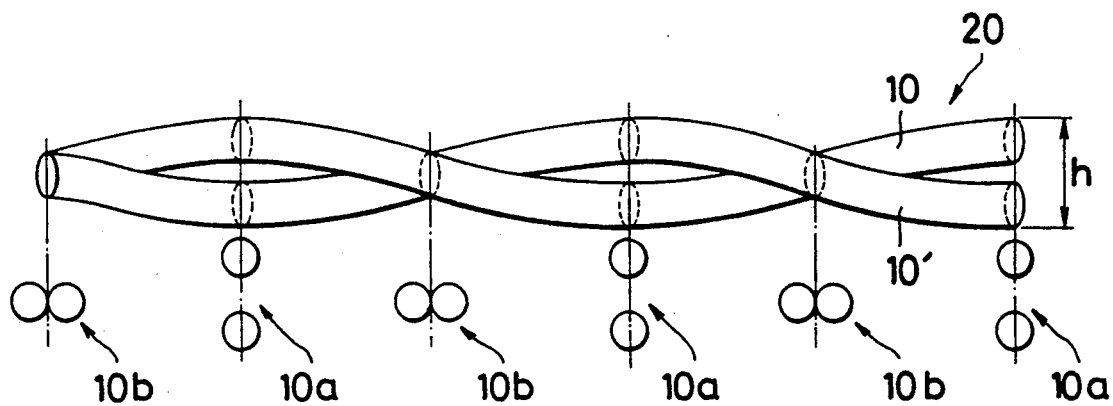
FIG. 2 is a diagrammatic plan view of the same shown with part in cross-section.

The flatness ratio f, as illustrated in FIGS. 1 and 2, is defined by f=2d/h where d is a diameter of a filament 10 and h is a maximum dimension of a cord 20. The flatness ratio f specified above has been found essential to achieve the objective of the invention after extensive experiments and results evaluation.

It has now been found that flatness ratios of a 1×2 steel cord 20 in the range of 0.6≦f≦0.9 support the fact that the two constituent filaments 10 and 10' periodically appear with their resepective portions completely encompassed by rubber and hence without continuity of bare filament to filament contact areas as cross-sectionally shown at 10a and 10b in FIG. 2. This cord characteristic ensures that the attack of water permeating through an external injury of the tire be held to an absolute minimum.

With flatness ratios smaller than 0.6 (f<0.6), rubber permeation through the cord may be sufficient to an extent to prevent the invasion of water from outside, but the filaments would be subjected to increased deformation and hence to localize strain during run of the tire, resulting in broken filaments. Furthermore, dimensional variations or irregularities would occur in the manufacture of tires.

Figure 3:
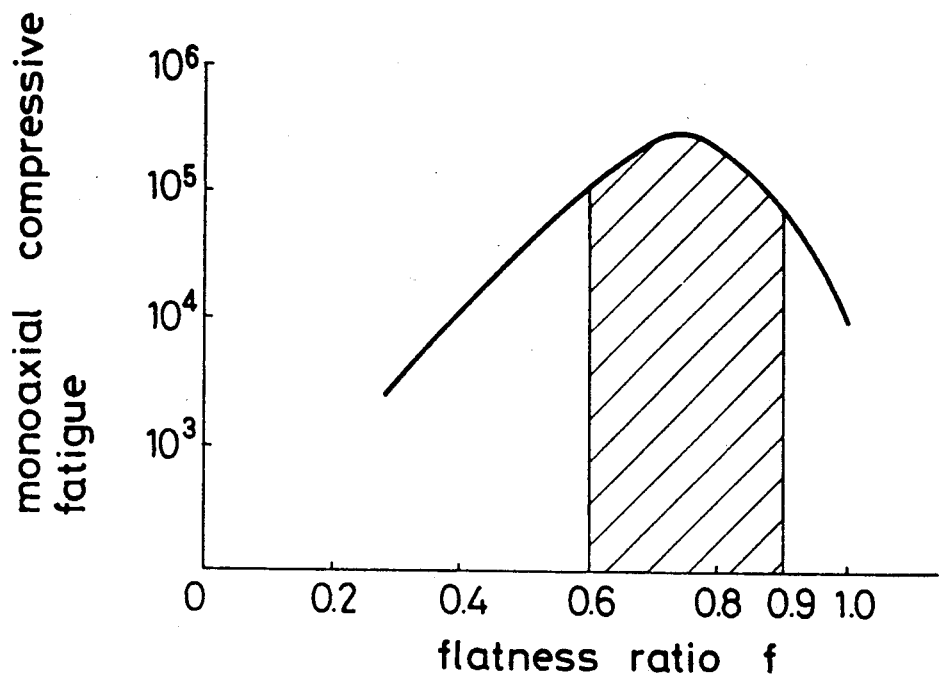
FIG. 3 is a graph showing a mono-axial compression fatigue plotted against a flatness ratio.
Figure 4:
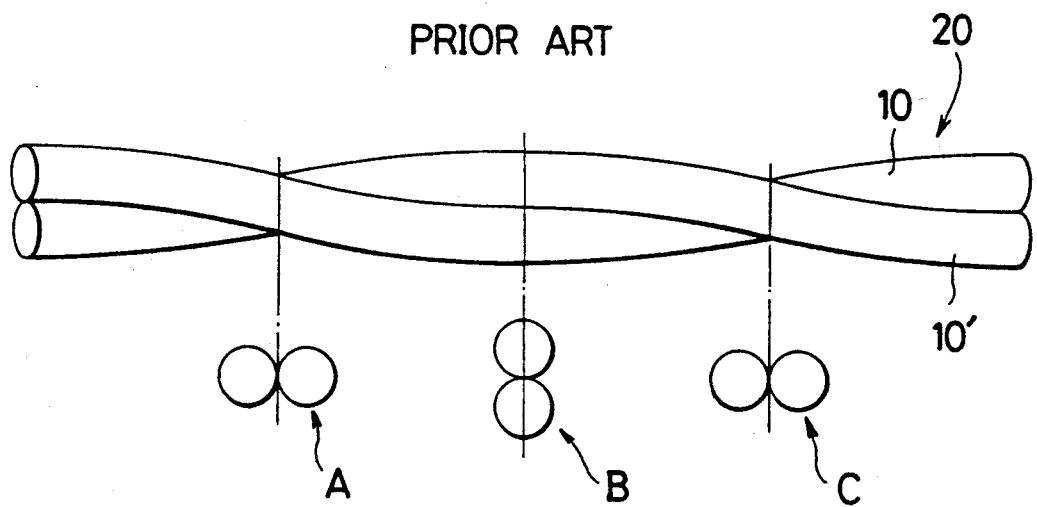
FIG. 4 is a diagrammatic side view of a prior art 1×2 cord shown with part in cross-section.

Whereas, with flatness ratios greater than 0.9 (f>0.9), rubber permeation would be insufficient and moisture-absorptive fatigue would sharply decline. This is apparent from FIG. 3 in which monoaxial compressive fatigue is plotted against a flatness ratio f of the cord. Compressive fatigue test to determine the durability of the belt portion of the tire is usually performed by an accelerating life tester on which the rubber coated steel cords are subjected to moisture-absorptive deterioration at a temperature of 120° C. and a relative humidity of 95% and thereafter repeatedly applied with 5% compressive strain per cord, the number of cycles of repetition of such strain application being counted up to the point of breakage of the cords. This cycle number decreases with rubber coated steel cords having flatness ratios of smaller than 0.6 and larger than 0.9 as shown in FIG. 3.

To achieve flatness ratios f in the range of 0.6≦f≦0.9, the two starting filaments are first individually preformed on a pin type preformer or a preover twister into a sinusoidal shape having a maximum dimension greater than 2d and are then intertwisted on a Buncher type twister to form a cord. Preferably, the filaments are preformed according to the equation T/d ≧3, where T is the maximum dimension of the sinusoidal shaped filament or the degree of preforming, and d is the diameter of the filament.

The cord composed of the two filaments is then pressed or crushed in one direction to the extent necessary on, for example, a rolling mill, so that the cord undergoes transverse cross-sectional deformation or flattening. This results in the cord of FIGS. 1 and 2, where the two filaments 10 and 10' when viewed in the plan direction end up with open regions 10a between the two that will be completely filled or encompassed by the rubbery material of the rubber layer periodically alternating with regions 10b where the bare filaments 10 and 10' are in direct contact with each other. The open regions 10a cannot be seen when viewed from the side, as shown in FIG. 1, due to the flattening of the cord. The twist lay length, or the twist pitch of the respective filaments, though not specifically limited, may be preferably in the range of 8 mm–16 mm.

The invention will be further described by way of the following example.

EXAMPLE

A total of six different pneumatic radial tires Nos. 1–6 each of size 195/70 R14 having steel corded belt layers with a twist pitch of 14 mm were mounted on a test car and were inflated to an air pressure of 2 kg/cm$^2$. The car was run on a paved road for a total travel distance of 60,000 kilometers. Each tire had been initially provided with a hole in the tread at two different places reaching the belt layers so as to facilitate permeation of water into the tire on travel. The belt layers were checked for failures with the results listed in the Table in which rubber penetration in the steel cords is represented in percentage by the ratio of the length of filament-to-filament spacing to the length of filaments completely covered with rubber. The length of the cord rusted was measured from the tip end of each hole. Cord breakage was determined by X-ray applied to the tire belt.

It will be seen from the below tabulated test results that Tire Nos. 1, 5 and 6 (controls) having cord flatness ratios f deviating from the specified range of 0.6≦f≦0.9 are acceptable in some respects but are unsatisfactory in other respects. In contrast, tire Nos. 2, 3 and 4 (inventive products) are satisfactory in all respects of the test owing to compliance with the specified flatness ratios f according to the invention.

TABLE

| Tire No. | 1 | 2 | 3 | 4 | 5 | 6 |
| --- | --- | --- | --- | --- | --- | --- |
| Cord | 1 × 2 × 0.30 | 1 × 2 × 0.30 | 1 × 2 × 0.30 | 1 × 2 × 0.30 | 1 × 2 × 0.30 | 1 × 2 × 0.30 |
| Flatness ratio (f) | 1 | 0.9 | 0.75 | 0.6 | 0.5 | 0.3 |
| Compressive fatigue | $10^4$ | $10^5$ | $10^{5.5}$ | $10^5$ | $10^{4.5}$ | $10^{3.5}$ |
| Rubber penetration (%) | 5 | 90 | 90 | 95 | 95 | 95 |
| Rust length (mm) | 20 | 5 | 3 | 3 | 3 | 3 |
| Cord breakage | yes | no | no | no | yes | yes |

Note:
Tire Nos. 2, 3 and 4 are products of the invention. Tire Nos. 1, 5 and 6 are controls.

What is claimed is:

1. In a pneumatic radial tire for an automotive vehicle having at least one steel cord embedded in a rubber layer forming a part thereof, the improvement wherein said steel cord consists of two identical round, steel filaments intertwisted together, each filament having a diameter d and being preformed into a sinusoidal shape prior to being intertwisted, the maximum dimension of each sinusoidal shaped filament being greater than 2d, the maximum dominion of the cord formed of the two filaments being substantially equal to twice the diameter of the individual filaments in a first direction and the maximum dimension is a second direction perpendicular to said first direction being h, where the ratio of 2d/h is from 0.6 to 0.9, said cord being substantially flat along its length with the orientation of its dimensions in said first and second directions being substantially constant throughout its length whereby said intertwisted filaments, along the length of the cord, have non-contact areas wherein each filament is completely embedded in the rubber of the layer periodically alternating with areas where the filaments are in direct contact with each other.

2. The pneumatic radial tire of claim 1, wherein the twist pitch of the intertwisted filaments is from 8 mm to 16 mm.

* * * * *

UNITED STATES PATENT AND TRADEMARK OFFICE
CERTIFICATE OF CORRECTION

PATENT NO. : 5,213,652

DATED : May 25, 1993

INVENTOR(S) : Hisao Katoh et al

It is certified that error appears in the above-identified patent and that said Letters Patent is hereby corrected as shown below:

Claim 1, column 4, line 62, change "dominion" to --dimension--.

Signed and Sealed this

Twenty-fifth Day of January, 1994

Attest:

BRUCE LEHMAN

Attesting Officer  Commissioner of Patents and Trademarks